United States Patent [19]

Gronert et al.

[11] Patent Number: 4,569,533
[45] Date of Patent: Feb. 11, 1986

[54] VAN STEP

[75] Inventors: Steven A. Gronert, Marcellus, Mich.; Dale Love, Middlebury; Stephen R. Elliott, Goshen, both of Ind.

[73] Assignee: Coachmen Industries, Inc., Elkhart, Ind.

[21] Appl. No.: 638,976

[22] Filed: Aug. 8, 1984

[51] Int. Cl.$^4$ .............................................. B60R 3/00
[52] U.S. Cl. .................................. 280/163; 105/443; 182/90
[58] Field of Search ............... 280/163, 164 R, 164 A, 280/169; 182/90, 88, 127; 296/62; 105/326, 443, 460

[56] References Cited

U.S. PATENT DOCUMENTS

| | | | |
|---|---|---|---|
| 1,415,699 | 5/1922 | Porter | 280/163 |
| 3,171,671 | 3/1965 | Cornett | 280/163 |
| 4,121,691 | 10/1978 | Poplawski | 280/163 |

Primary Examiner—David M. Mitchell
Assistant Examiner—Richard Camby
Attorney, Agent, or Firm—James D. Hall

[57] ABSTRACT

A step attachment adapted for mounting to the body of a van or similar vehicle. The step includes a bracket fitted within a recess in the vehicle body and a step-defining cover which is supported atop horizontal flanges of the bracket.

3 Claims, 4 Drawing Figures

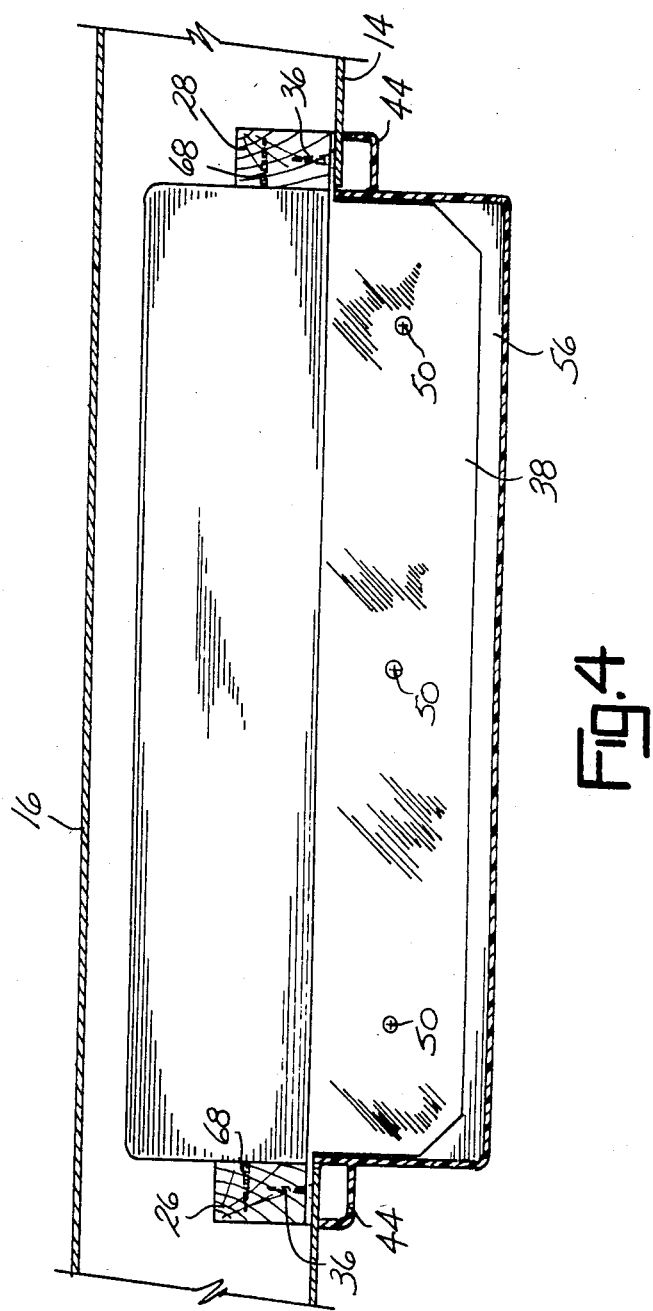

VAN STEP

SUMMARY OF THE INVENTION

This invention relates to a step attachment for a van or similar vehicle.

A common feature found on most vans is a ladder attached to the rear door of the van. The ladder allows a person access to the luggage rack located atop the van. An alternative to such a ladder is a step attachment which fits into the van rear door. The step of this invention includes a bracket support which includes vertical members connected by spaced horizontal members fitted within the door recess. Each horizontal member includes an extending flange which supports a horizontal step part of a cover which is fitted within the bracket.

Accordingly, it is an object of this invention to provide for a step attachment which is for a van or similar vehicle.

Another object of this invention is to provide for a van step which is durable and economical.

Another object of this invention is to provide for a van step which is easily installed on the van.

Other objects of the invention will become apparent upon reading the following specification.

BRIEF DESCRIPTION OF THE DRAWINGS

A preferred embodiment of the invention has been chosen for purposes of illustration wherein:

FIG. 4 is a sectional view taken along line 4—4 of FIG. 3.

DESCRIPTION OF THE PREFERRED EMBODIMENT

Figure 1:
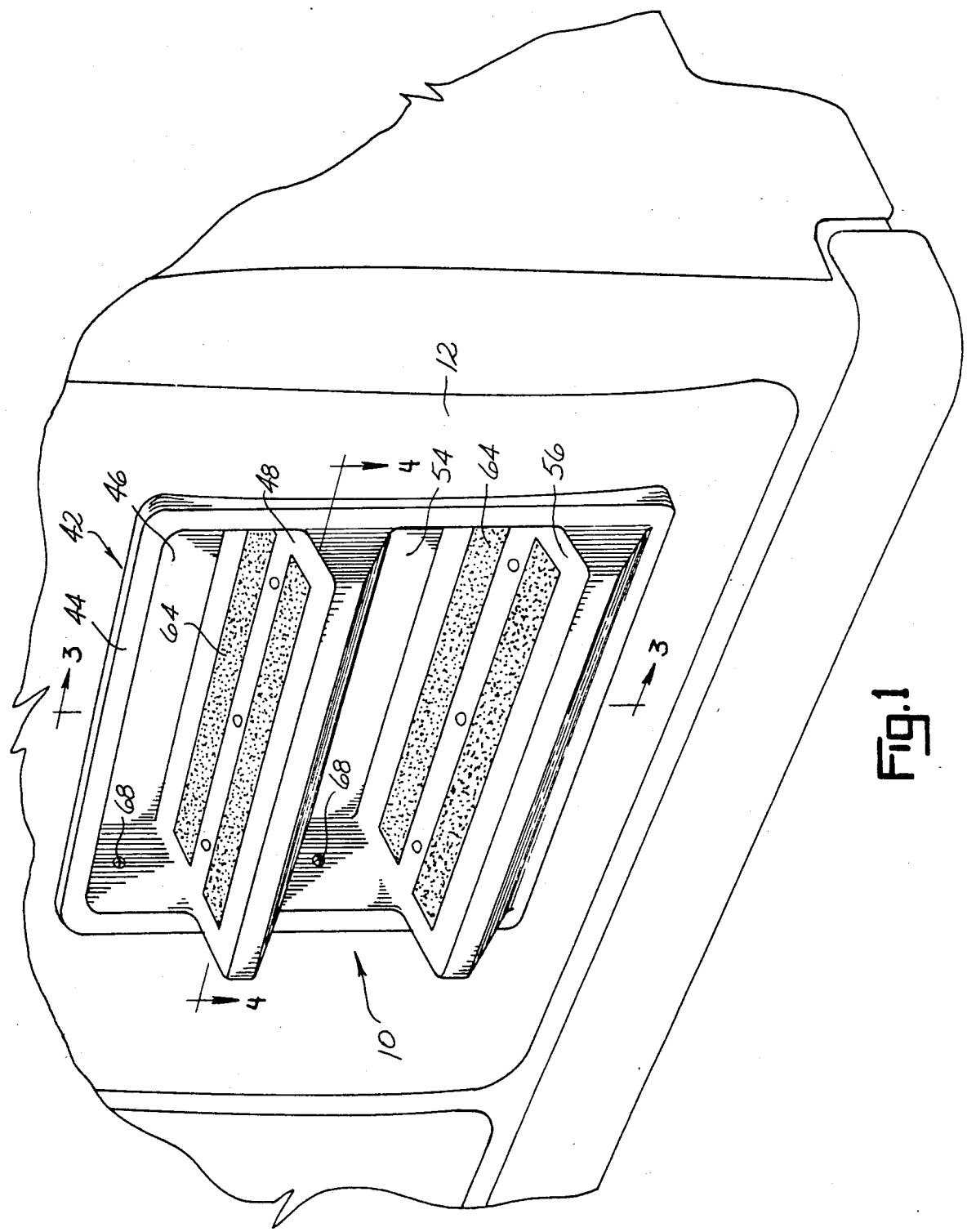
FIG. 1 is a perspective view of the step of this invention shown in use on a van rear door.
Figure 2:
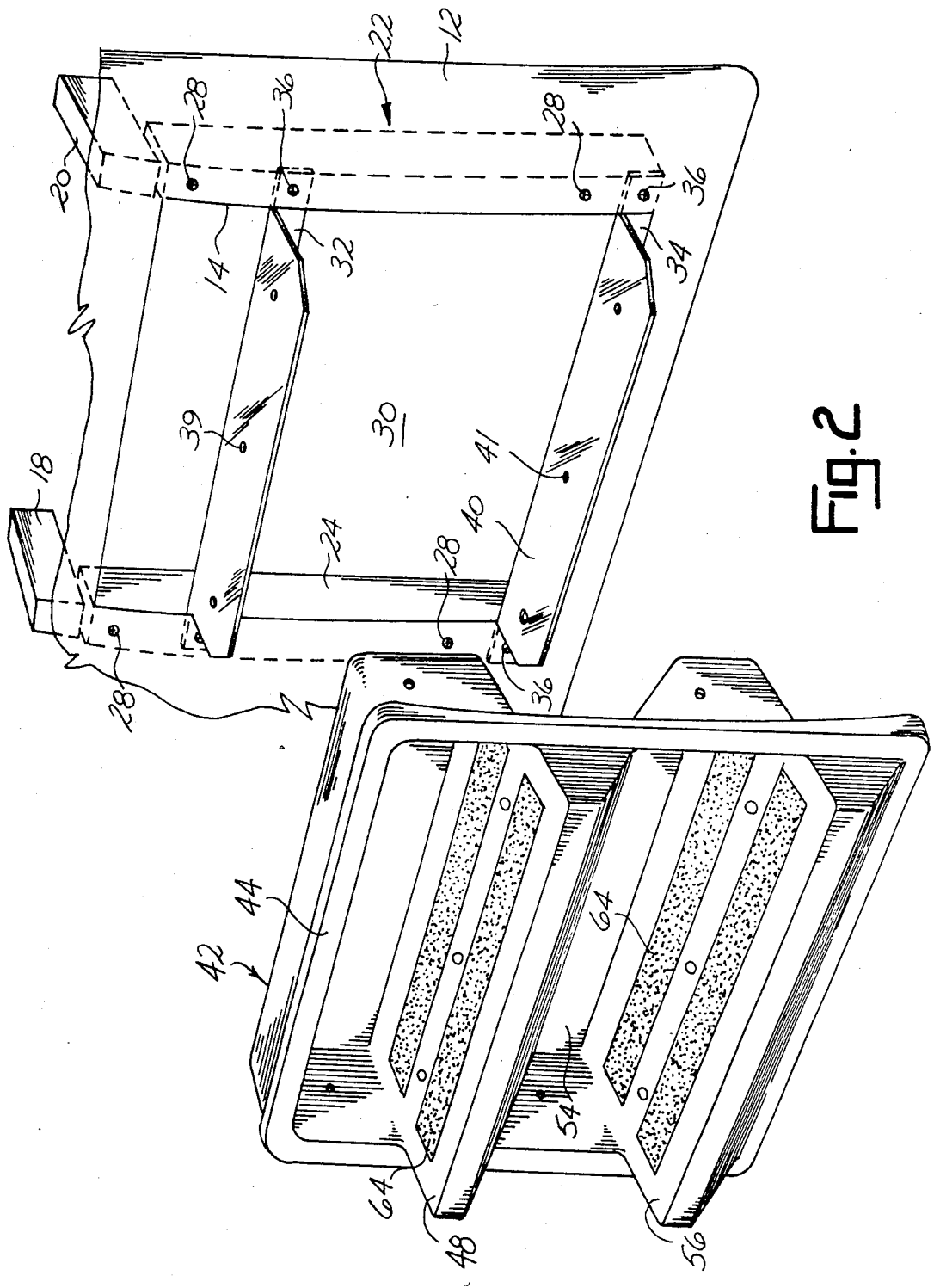
FIG. 2 is a perspective view of the step with the components shown in separated form.

The preferred embodiment herein described is not intended to be exhaustive or to limit the invention to the precise form disclosed. It is chosen and described to explain the principles of the invention and its application and practical use to thereby enable others skilled in the art to utilize the invention.

The step attachment 10 shown in the drawings is preferably used in conjunction with a van or similar vehicle and may be mounted to the vehicle rear door 12. Door 12 is formed of spaced outer panel 14 and inner panel 16 supported by spacers 18 and 20 extending between the panels.

Step attachment 10 includes a support bracket 22 formed of metal and wood, or similar durable material, which fits within an opening 30 cut in outer panel 14 of door 12. Bracket 22 includes a pair of vertically oriented support members 24 and 26 which are fastened to the inside of outer door panel 14 by fasteners, such as screws 28. A pair of horizontal cross members 32 and 34 extend between vertical members 24, 26 and are secured by fasteners, such as screws 36. Each horizontal cross member 32, 34 includes a centrally located outwardly extending flange 38, 40 which projects forwardly of the plane of panel 14.

Figure 3:
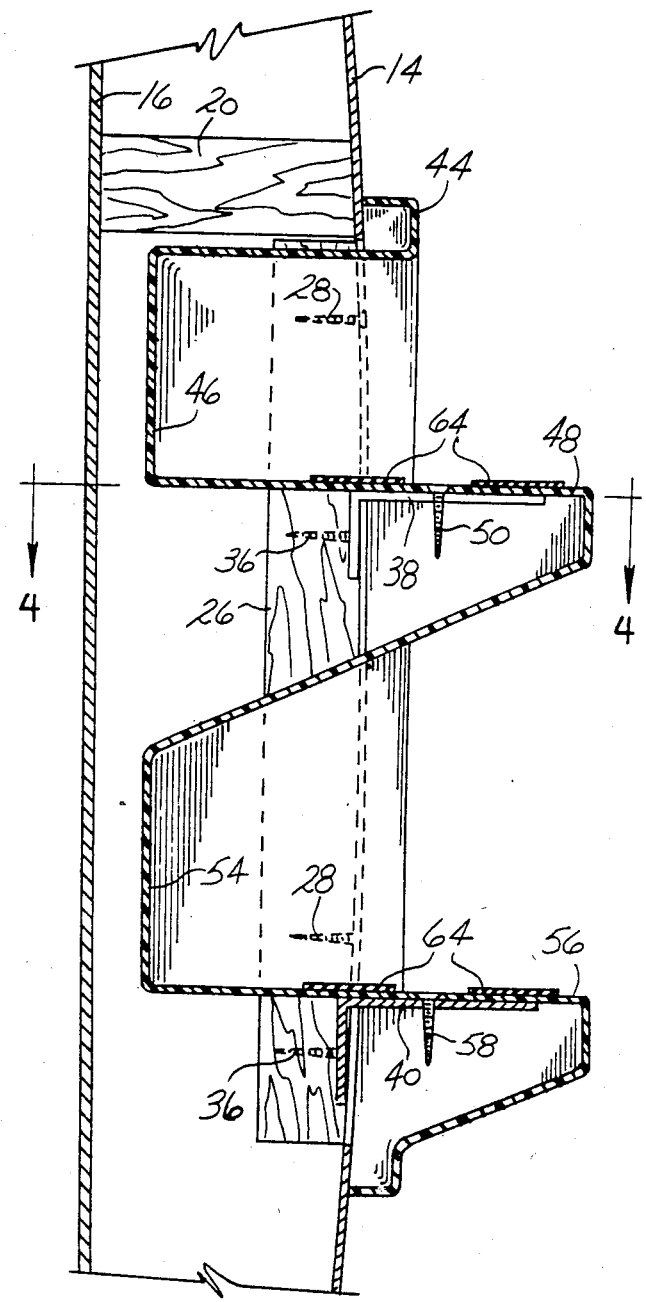
FIG. 3 is a sectional view taken along line 3—3 of FIG. 1.

Attachment 10 also includes a step-defining cover 42 formed of lightweight metal, thermoplastic, or fiberglass material. Cover 42 is of a one-piece construction and is preferably of the general sectionalized configuration shown in FIG. 3. Cover 42 includes an annular trip flanged portion 44 and an upper recessed or channel part 46 which forms a step 48. A lower recess or channel part 54 is located below step 48 which forms a step 56. Additionally, steps 48, 56 may include nonslip stripping 64 to assure safe footing for a person using step attachment 10.

Attachment 10 is assembled as follows. Vertical member 24, 26 are fastened to the inside of door panel 14 next to the vertical sides of opening 30 by turning screws 28 through the panel into the respective vertical member. Cross members 32 and 34 are then fitted between panel 14 and vertical members 24 and 26 with flanges 38 and 40 extending forwardly of outer door panel 14. Screws 36 are then turned through panel 14 and cross members 34, 36 into vertical members 24 and 26. Step defining cover 42 is then fitted into panel opening 30 with steps 48 and 56 overlying and supported upon cross member flanges 38 and 40. Cover 42 is then fastened to vertical members 24 and 26 by turning a series of screws 68 through the cover into the vertical members. Steps 48 and 56 are then anchored to flanges 38 and 40 by turning fasteners 50 and 58 through the steps and into the bores 39 and 41 in the flanges.

It is to be understood that the scope of the invention is not limited to the above description but may be modified within the scope of the appended claims.

I claim:

1. A step attachment for mounting to the body of a vehicle comprising a support bracket adapted for mounting in a recess in the vehicle body and attachment to said vehicle, said support bracket including spaced apart vertical support members interconnected by horizontal cross members, each said cross member including an outwardly protruding flange part, and a cover fitted over said bracket, said cover having horizontal steps which overlie and are supported atop said cross member flange parts.

2. A step attachment secured to a vehicle body part, said body part including a panel, an opening defined in said panel forming a recess in said body, said step attachment comprising a bracket secured to said panel within said recess, said bracket including spaced vertical support members interconnected by horizontal cross members secured thereto, each said cross member including an outwardly protruding flange part, a cover fitted over said bracket, said cover having horizontal steps which overlie and are supported atop said cross member flange parts, and means attaching said cover to said bracket.

3. The step attachment of claim 2 wherein said vertical support members are secured to the inside of said panel at the edges of said panel opening, said cover spanning said opening and attached to said vertical support members.

* * * * *